United States Patent
Redzinsky et al.

(10) Patent No.: US 6,206,555 B1
(45) Date of Patent: Mar. 27, 2001

(54) HEADLIGHT FOR LOW BEAM AND HIGH BEAM OF A VEHICLE

(75) Inventors: Kirsten Redzinsky; Heinz Grimm, both of Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/245,689

(22) Filed: Feb. 6, 1999

(30) Foreign Application Priority Data

Feb. 13, 1998 (DE) .................................... 198 05 852

(51) Int. Cl.⁷ .................................................... B60Q 1/076
(52) U.S. Cl. ......................... 362/526; 362/467; 362/286
(58) Field of Search ................................... 362/285, 286, 362/288, 386, 465, 467, 523, 524, 526, 549, 418

(56) References Cited

U.S. PATENT DOCUMENTS 3,229,082 * 1/1966 Barron .................................. 362/288
5,911,502 * 6/1999 Zillgitt et al. ......................... 362/508
5,971,574 * 10/1999 Taniuchi et al. ...................... 362/508

FOREIGN PATENT DOCUMENTS 2 316 187   10/1974 (DE) .
44 35 507 A1   4/1996 (DE) .

* cited by examiner

Primary Examiner—Y. Quach
(74) Attorney, Agent, or Firm—Michael J. Striker

(57) ABSTRACT

A headlight for a low beam and a high beam in a vehicle has a reflector, a light source, an adjusting device operative for displacing the light source relative to the reflector between a position for a low beam and a position for a high beam, the adjusting device including holding means which produce a holding force for fixing the light source in one of the two positions.

5 Claims, 1 Drawing Sheet

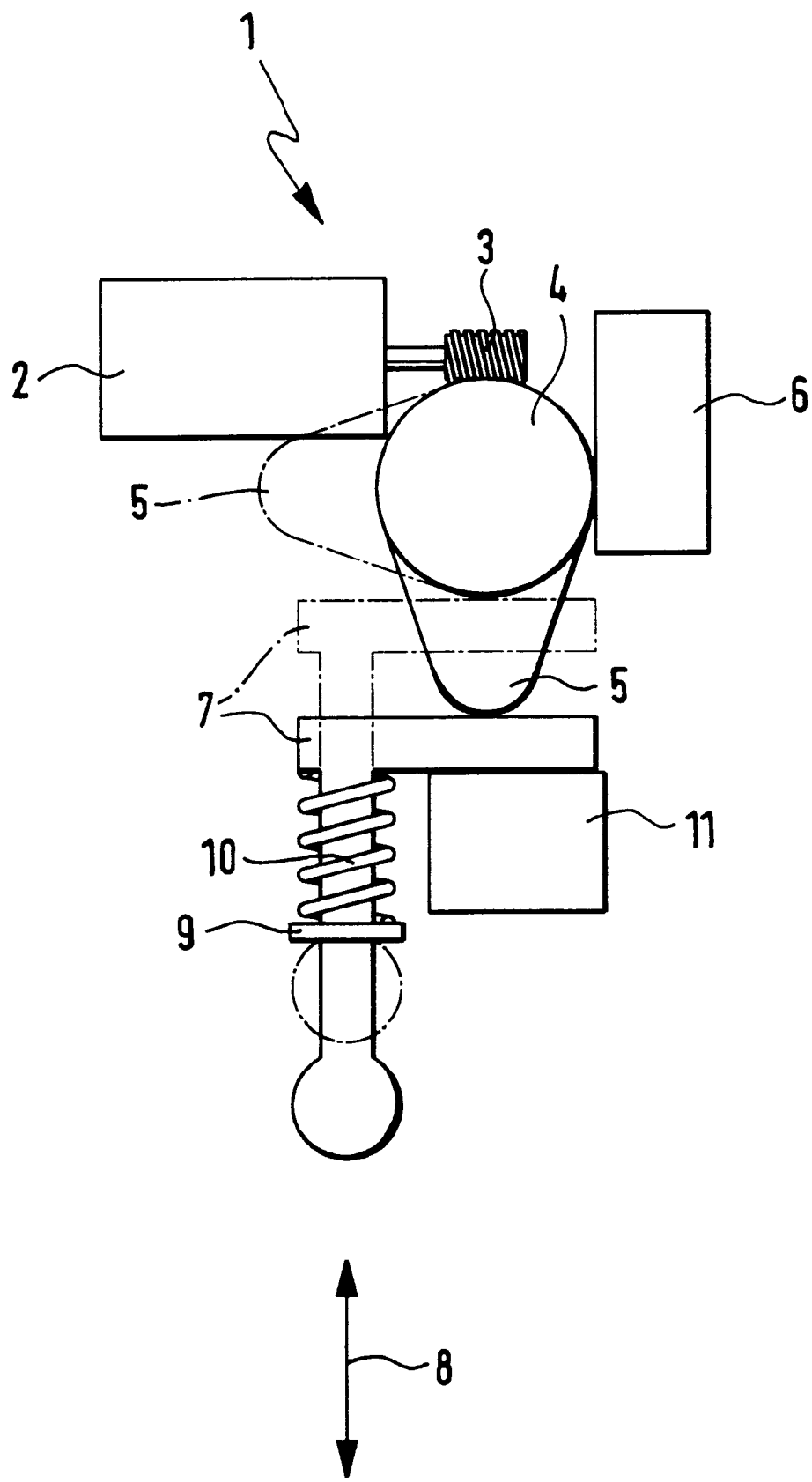

HEADLIGHT FOR LOW BEAM AND HIGH BEAM OF A VEHICLE

BACKGROUND OF THE INVENTION

The present invention relates to a headlight in particular for providing a high beam and a low beam in a vehicle, which has a reflector, a light source, and an adjusting device for adjusting the light source relative to the reflector between a position for the low beam and a position for the high beam.

Such a headlight is disclosed for example in the German patent document DE 44 35 507 A1. In this reference the light source is movable in direction of the optical axis of the reflector and also vertically to the optical axis of the reflector. For performing the movement oriented vertically to the optical axis, the light source is turnable about an axis arranged perpendicular to the optical axis of the headlight. An electric motor is connected with the light source at a distance from the axis and turns the light source about the axis. For converting the rotary movement of the electric motor into the turning movement of the light source, it is proposed in this reference to use a thread, a transmission, a coulisse guide or a cam disk, etc. With the corresponding control of the electric motor the light source is moved to the position for the low beam or to the position for the high beam.

SUMMARY OF THE INVENTION

Accordingly, it is an object of the present invention to provide a headlight for the low beam and the high beam in a vehicle, which has a simple construction and provides a high operational safety.

In keeping with these objects and with others which will become apparent hereinafter, one feature of present invention resides, briefly stated, in a headlight in which the adjusting device is provided with holding means which produces a holding force for fixing the light source in one of the two positions. The light source is not held by the adjusting device in both positions for the low beam and the high beam as in the prior art, but instead the holding device is provided for fixing at least one of the two positions. Thereby, it is possible, without high structural expenses to increase the operational safety of the total headlight.

It is especially advantageous when the light source in the position for the high beam is fixed by the holding device. If there are some interferences in the position for the high beam and the like, then it is possible independently from the adjusting device to move back the light source from the position for the high beam to the position for the low beam. This is achieved in that the holding force is no longer produced by the holding device and thereby the light source is automatically moved from the position for the high beam to the position for the low beam. In particular, it is possible in the event of failure of the adjusting device, to move the light source back to the position for the low beam.

In accordance with a further advantageous embodiment of the present invention, the holding device is formed as a coil or the like. Thereby the desired holding force can be produced electromagnetically by corresponding electrical control of the coil. With the corresponding arrangement of the coil, the holding force can act directly on the light source or on the metallic support of the light source.

In an advantageous embodiment of the invention, a force which counteracts the holding force of the holding device is provided for acting on the light source. This counteracting force acts so that the light source, for example in the event of interference, in each case can move back from the position for the high beam to the position for the low beam. In this headlight, the position for the low beam represents a basic position, to which the light source always returns in the event of a failure or a similar disturbances.

In a further advantageous embodiment of the present invention, a spring or the like is used for producing the counteracting force. This provides for a special and simple construction for producing the force which counteracts the holding force of the holding device.

In accordance with another advantageous feature of the present invention, the means are provided for displacing the light source to the position which is fixed by the holding device. With this means, the light source also is moved from the position for the low beam to the position for the high beam. In the position for the high beam, the light source is fixed by the holding device. By means of the spring, the light source is again moved back from the position for the high beam to the position for the low beam.

In a further embodiment of the invention, a cam or the like which is driven by the electric motor is used for displacement of the light source. It forms an especially simple structural element for moving the light source in direction toward the position fixed by the holding device. When the light source reaches the position for the high beam, it is fixed there by the holding device. The cam can move it to an initial position, so that the light source is again freely movable, and when needed can be moved back by means of the spring to the position for the low beam. This process can be repeated anytime, and the whole process is controlled by controlling of the electric motor of the cam and the controlling of the holding device.

In a further preferable embodiment of the invention, the holding device and the means for displacing the light source in direction to the position fixed by the holding device are controllable by the user-standard operation of the low beam and the high beam. In the initial position, the light source is located in the position for the low beam. If a user wants to switch to the high beam, the light source is moved by the cam in direction toward the holding device. There the light source is fixed by the holding device in the position for the high beam. This can be provided by a corresponding electrical control, for example the coil. The cam moves back as mentioned above, again to its initial position. If a user wants to switch to the low beam, the holding device is deactivated. As a result, the light source is moved by the spring to the position for the low beam.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an example of a headlight in accordance with the present invention, and in particular its part which is associated with a displacement of a light source inside the headlight.

DESCRIPTION OF PREFERRED EMBODIMENTS

A headlight in accordance with the present invention has a part which is provided in a vehicle for producing a low beam and a high beam and is shown in the drawings. The headlight has a reflector and a light source. The light source is reciprocatingly movable between a position for the low beam and a position for the high beam. For this purpose, an adjusting device 1 is provided as shown in the drawing.

The adjusting device has an electric motor 2 which is provided with a screw transmission 3 or the like. The screw transmission 3 is coupled with a turnable control element 4 so that a rotary movement of the screw transmission 3 is converted into a rotary movement of the control element 4.

The control element 4 has a projecting cam 5. A switch 6 is associated with the control element 4.

The control element 4 with the cam 5 is formed so that it can act on a substantially L-shaped holding member 7. For this purpose, one leg of the holding member 7 abuts against a periphery of the control element 4 and thereby against a periphery of the cam 5. The holding member 7 is supported so that it is reciprocatable in a direction 8. A stationary abutment 9 is associated with the holding member 7. A spring 10 is arranged between the abutment 9 and the holding member 7 so as to press the holding member 7 in direction 8 toward the control element 4. In particular, the leg of the holding member 7 which does not abut against the control element 4 supports the spring 10 so that the other leg, as mentioned above, always abuts in particular against the periphery of the cam 5.

A coil 11 is arranged at the side of the holding member 7 which faces away from the control element 4. The coil 11 is dimensioned so that it can hold the holding member 7 against the force of the spring 10.

The electric motor 2, the switch 6 and the coil 11 are connected with an electrical control device, in particular with a microprocessor. Several operating elements are connected with the control device, so that an operator with the use of the operating elements can switch the vehicle from the low beam to the high beam.

The holding member 7 is coupled with the light source, so that a displacement of the holding member 7 in direction 8 results also in the displacement of the light source.

In an initial condition, the control element 4 and the holding member 7 are located in a position shown in a broken line. This position corresponds to the position for the low beam. The light source is located also in the position for the low beam.

If a user wants to switch the vehicle to the high beam, it sets the electric motor in operation by the control device. As a result, the control element 4 with the cam 5 is moved from the position shown in a broken line to the position shown in a solid line. During this rotary movement, the holding member 7 is simultaneously displaced by the cam 5 in the direction 8. This means that the holding member is moved in direction toward the coil 11.

In the position shown in the drawings, the light source is coupled with the holding member 7 which is the position for the high beam. This position is recognized by the switch 6. As a result, the control device controls the coil 11 so that the holding member 7 is held by the coil 11 in the position shown in the solid line. The holding member 7 and thereby the light source are held by the coil 11 in the position for the high beam.

Simultaneously, the control device controls the electric motor 2 in dependence on the switch, 6 so that either the control element is turned with the cam 5 to the position shown in a broken line, or the control element 4 is turned further with a cam 5 to the position which is opposite to the position shown in the broken line. In the first case the electric motor 2 changes the polarity by the control device, while in the second case the electric motor 2 operates further without changes.

In general, a condition is produced, in which the control element with the cam 5 is located either in the position shown in the broken line or in the opposite position. The electric motor 2 is turned off. The holding member 7 is located in the position shown in the solid line and held by the coil 11 in this position. For this purpose, the corresponding required current flows through the coil 11. The described position corresponds, as mentioned above, to the position of the high beam of the headlight.

If the user of the vehicle wants to switch from the high beam to the low beam, it is only necessary that the control device turns off the current through the coil 11. Thereby the holding member 7 is no longer held by the coil 11. The force produced by the spring 10 results in that the holding member 7 is moved back in direction to the control element 4. The holding member 7 is therefore moved to the position shown in the broken line, which corresponds to the position for the low beam.

Instead of the cam 5, also a cam disk or a similar element can be utilized. It is also possible to form the holding member 7 symmetrically. Also, it is possible to arrange the control element 4 rotatably so that a polarity change of the electric motor 2 is not necessary. It is also possible to dispense with the switch 6. In this case the required switching of the motor 2 can be performed in that the coil 11 is provided with a switch or a similar sensor. In some cases it is also possible to use the current through the coil 11 for the determination.

Furthermore, it is possible to provide the coil 11 with means for a return coupling. The return coupling ensures that the holding member 7 and thereby the light source reaches the position for the high beam.

While the invention has been illustrated and described as embodied in headlight for low beam and high beam of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a low beam and high beam in a vehicle, comprising a reflector; a light source; an adjusting device operative for displacing said light source relative to said reflector between a position for a low beam and a position for a high beam, said adjusting device including holding means and means for displaying said light source; said holding means including a coil and produced a holding force for fixing said light source in one of said low beam position and said high beam position; and said means for displacing said light source in direction to said one of said low beam position and said high beam position in which said light source is fixed by said holding means, said means for displacing said light source in direction to said one of said low beam position and said high beam position in which said light source is fixed by said holding means including an electric motor and a cam driven by said electric motor and displacing said light source.

2. A headlight as defined in claim 1, wherein said holding means is formed to produce a holding force which fixes said light source in a position for the high beam.

3. A headlight as defined in claim 1; and further comprising means providing a force which is opposite to the holding force of said holding means and acts on said light source.

4. A headlight as defined in claim 3, wherein said means for providing the opposite force is formed as a spring which provides the force opposite to the holding force.

5. A headlight as defined in claim 1, wherein said holding means and said means for displacing said light source in direction to the position fixed by said holding means are controllable by a operation of the low beam and the high beam by a user.

* * * * *